United States Patent [19]

Chang

[11] Patent Number: 5,629,253
[45] Date of Patent: May 13, 1997

[54] POLYMERIZATION CATALYST SYSTEMS, THEIR PRODUCTION AND USE

[75] Inventor: Main Chang, Houston, Tex.

[73] Assignee: Exxon Chemical Patents, Inc., Wilmington, Del.

[21] Appl. No.: 586,362

[22] Filed: Jan. 16, 1996

Related U.S. Application Data

[63] Continuation of Ser. No. 417,484, Apr. 5, 1995, abandoned, which is a continuation of Ser. No. 233,668, Apr. 26, 1994, abandoned.

[51] Int. Cl.$^6$ ............................................. C08F 4/64
[52] U.S. Cl. .................... 502/111; 502/104; 502/117; 502/120; 502/152; 526/160; 526/943
[58] Field of Search .................... 502/104, 111, 502/117, 120, 152; 526/160, 943

[56] References Cited

U.S. PATENT DOCUMENTS

| | | | |
|---|---|---|---|
| 4,912,075 | 3/1990 | Chang | 502/107 |
| 4,914,253 | 4/1990 | Chang | 585/523 |
| 4,935,397 | 6/1990 | Chang | 502/117 |
| 4,937,217 | 6/1990 | Chang | 502/111 |
| 4,937,301 | 6/1990 | Chang | 526/128 |
| 5,008,228 | 4/1991 | Chang | 502/111 |
| 5,086,025 | 2/1992 | Chang | 502/117 |
| 5,147,949 | 9/1992 | Chang | 526/129 |
| 5,238,892 | 8/1993 | Chang | 502/111 |

OTHER PUBLICATIONS

Hawley's Condensed Chemical Dictionary, 1987, 11th Edition, p. 1014.

*Primary Examiner*—David W. Wu
*Attorney, Agent, or Firm*—Jaimes Sher; C. Paige Schmidt

[57] ABSTRACT

This invention is generally directed toward a supported catalyst system useful for polymerizing olefins. The method for supporting the catalyst of the invention provides for a supported bulky ligand transition metal catalyst which when utilized in a polymerization process substantially reduces the reactor fouling and sheeting particularly in a slurry phase polymerization process.

13 Claims, No Drawings

POLYMERIZATION CATALYST SYSTEMS, THEIR PRODUCTION AND USE

This is a continuation of application Ser. No. 08/417,484, filed Apr. 5, 1995, now abandoned which is a continuation of U.S. application Ser. No. 08/233,668, filed Apr. 26, 1994, now abandoned.

FIELD OF THE INVENTION

This invention relates to catalysts, catalyst systems and to methods for their production and use in olefin polymerization. The invention particularly relates to a process for preparing a supported bulky ligand transition metal compound for use in the gas phase, slurry phase or liquid/solution phase with improved reactor operability.

BACKGROUND OF THE INVENTION

It is desirable in many polymerization processes, particularly a slurry phase or gas phase process, to use a supported catalyst. Generally these catalyst systems include a metallocene and alumoxane supported on the same carrier, such as silica, and subsequently dried to a powder. For example, U.S. Pat. No. 4,937,217 generally describes a mixture of trimethylaluminum and triethylaluminum added to an undehydrated silica then adding a metallocene to form a dry catalyst. EP-308177-B1 generally describes adding a wet monomer to a reactor containing a metallocene, trialkylaluminum and undehydrated silica. U.S. Pat. Nos. 4,912,075, 4,935,397 and 4,937,301 generally relate to adding trimethylaluminum to an undehydrated silica and then adding a metallocene to form a dry supported catalyst. U.S. Pat. No. 4,914,253 describes adding trimethylaluminum to undehydrated silica, adding a metallocene and then drying the catalyst with an amount of hydrogen to produce a polyethylene wax. U.S. Pat. Nos. 4,808,561, 4,897,455 and 4,701,432 describe techniques to form a supported catalyst where the inert carrier, typically silica, is calcined and contacted with a metallocene(s) and a activator/cocatalyst component. U.S. Pat. No. 5,238,892 describes forming a dry supported catalyst by mixing a metallocene with an alkyl aluminum then adding undehydrated silica. U.S. Pat. No. 5,240,894 generally pertains to forming a supported metallocene/alumoxane catalyst system by forming a metallocene/alumoxane reaction solution, adding a porous carrier, evaporating the resulting slurry to remove residual solvent from the carrier.

There are also those U.S. Pat. Nos. 5,008,228, 5,086,025 and 5,147,949 which generally describe forming a dry supported catalyst by the addition of trimethylaluminum to a water impregnated silica to form alumoxane in situ the silica pores and then adding the metallocene. While these supported catalysts are useful it would be desirable to have an improved catalyst system to produce polymers that are easier to process and produce. Particularly in a slurry or gas phase polymerization process, using these catalysts systems, there is a tendency for reactor fouling during polymerization within the reactor. During a typical polymerization process fines within the reactor often accumulate and cling or stick to the walls of a reactor. This phenomenon is often referred to as "sheeting". The accumulation of polymer particles on the reactor walls, the recycling lines and cooling system results in many problems including poor heat transfer in the polymerization process. Polymer particles that adhere to the walls of the reactor continue to polymerize and often fuse together and form chunks, which can be detrimental to a continuous process.

It would be highly desirable to have an improved polymerization catalyst that in a polymerization process would significantly enhance reactor operability and provide an improved polymer product.

SUMMARY OF THE INVENTION

This invention is generally directed towards a new polymerization catalyst system, to methods for its manufacture and to its use in a polymerization process.

In one embodiment an improved method is provided to produce a supported bulky ligand transition metal catalyst system by contacting a water containing support material with an organometallic compound capable of forming an activator for at least one metallocene compound, wherein the water containing support material is added to the organometallic component at temperature in the range of from about 30° C. to −45° C. and the mole ratio of the metal of the organometallic compound to the water content of the support material is greater than 0.7.

In another embodiment of the invention, there is provided a process for producing polyolefins by contacting olefin monomer, optionally with comonomer in the presence of the catalyst system described above.

In yet another embodiment there is provided a catalyst system produced by the improved method and to polymers and product produced therefrom in a polymerization process. In a further embodiment an improved supported alumoxane composition and an improved method of making the composition is provided.

DETAILED DESCRIPTION OF THE INVENTION

Introduction

This invention is generally directed toward a supported catalyst system useful for polymerizing olefins. The method for forming the catalyst system of the invention involves supporting a metallocene catalyst component or compound on an improved activator or cocatalyst of the invention, which is produced by contacting a specified amount of water containing support material with a specified amount of an organometallic compound under certain temperature conditions.

It has been discovered that by reducing the mole ratio of the metal of the organometallic compound to the water content of the support material a catalysts systems tendency to foul during polymerization is reduced, however, as a consequence of reducing the mole ratio, the catalyst system's activity is reduced. However, it has also been discovered that maintaining the temperature at a constant, and/or in a specific range when adding the water containing support material to the organoaluminum compound catalyst activity is maintained or in some instances increased. Making the catalyst of the invention this way results in a commercially useful supported catalyst system with a reduced tendency for sheeting or fouling in a polymerization reactor. Also, the catalyst system of this invention results in a polymer product having improved physical properties.

Catalyst Components of the Invention

Metallocene catalysts, for example, are typically those bulky ligand transition metal compounds derivable from the formula:

where L is a bulky ligand; A is at least one halogen leaving group, M is a transition metal and m and n are such that the total ligand valency corresponds to the transition metal valency. Preferably the catalyst is four co-ordinate such that the compound is ionizable to a 1+ valency state.

The ligands L and A may be bridged to each other, and if two ligands L and/or A are present, they may be bridged. The metallocene compound, may be full-sandwich compounds having two or more ligands L which may be cyclopentadienyl ligands or cyclopentadiene derived ligands or half-sandwich compounds having one ligand L, which is a cyclopentadienyl ligand or derived ligand.

The metallocene compounds contain a multiplicity of bonded atoms, preferably carbon atoms, forming a group which can be cyclic. The bulky ligand can be a cyclopentadienyl ligand or cyclopentadienyl derived ligand which can be mono- or poly-nuclear or any other ligand capable of η-5 bonding to the transition metal. One or more bulky ligands may be π-bonded to the transition metal atom. The transition metal atom may be a Group 4, 5 or 6 transition metal and/or a transition metal from the lanthanide and actinide series. Other ligands may be bonded to the transition metal, such as at least one halogen as a leaving group that is detachable from the transition metal. Non-limiting examples of metallocene catalysts and catalyst systems are discussed in for example, U.S. Pat. Nos. 4,530,914, 4,952,716, 5,124,418, 4,808,561, 4,897,455 all of which are herein fully incorporated by reference. Also, the disclosures of EP-A-0129,368, EP-A-0520732, EP-A-0277003, EP-A-0277004, EP-A- 0420436, WO 91/04257 WO 92/00333, WO 93/08221, and WO 93/08199 are all fully incorporated herein by reference.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al. and EP-A-0 129 368 published Jul. 26, 1989, and U.S. Pat. Nos. 5,017,714 and 5,120,867 to Welborn, Jr. all of which are fully incorporated herein by reference. These publications teach the structure of the metallocene catalysts and include alumoxane as the cocatalyst. There are a variety of methods for preparing alumoxane one of which is described in U.S. Pat. No. 4,665,208 incorporated herein by reference.

Further, the metallocene catalyst component of the invention can be a monocyclopentadienyl heteroatom containing compound. This heteroatom is activated by either an alumoxane or an alumoxane and an ionic activator to form an active polymerization catalyst system to produce polymers useful in this present invention. These types of catalyst systems are described in, for example, PCT International Publication WO 92/00333, WO 94/07928, and WO 91/04257, U.S. Pat. Nos. 5,057,475, 5,096,867, 5,055,438 and 5,227,440 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. No. 5,064,802 and PCT publications WO 93/08221 and WO 93/08199 published Apr. 29, 1993 all of which are herein incorporated by reference.

The preferred transition metal component of the catalyst of the invention are those of Group 4, particularly, zirconlure, titanium and hafnium. The transition metal may be in any oxidation state, preferably +3 or +4 or a mixture thereof. All the catalyst systems of the invention may be, optionally, prepolymerized or used in conjunction with an additive or scavenging component to enhance catalytic productivity.

For the purposes of this patent specification the term "metallocene" is defined to contain one or more unsubstituted or substituted cyclopentadienyl or cyclopentadienyl moiety in combination with a transition metal. In one embodiment the metallocene catalyst component is represented by the general formula $(C_p)_m MeR_n R'_p$ wherein at least one $C_p$ is an unsubstituted or, preferably, a substituted cyclopentadienyl ring even more preferably a monosubstituted cyclopentadienyl ring; Me is a Group 4, 5 or 6 transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of Me.

In another embodiment the metallocene catalyst component is represented by the formulas:

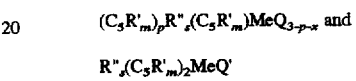

wherein Me is a Group 4, 5, 6 transition metal, $C_5R'_m$ is a substituted cyclopentadienyl, each R', which can be the same or different is hydrogen, alkyl, alkenyl, aryl, alkylaryl or arylalkyl radical having from 1 to 20 carbon atoms or two carbon atoms joined together to form a part of a $C_4$ to $C_{20}$ ring, R" is one or more of or a combination of a carbon, a germanium, a silicon, a phosphorous or a nitrogen atom containing radical bridging two ($C_5R'_m$) rings, or bridging one ($C_5R'm$) ring back to Me, when p=0 and x=1 otherwise "x" is always equal to 0, each Q which can be the same or different is an aryl, alkyl, alkenyl, alkylaryl, or arylalkyl radical having from 1 to 20 carbon atoms or halogen, Q' is an alkylidene radical having from 1–20 carbon atoms, s is 0 or 1 and when s is 0, m is 5 and p is 0, 1 or 2 and when s is 1, m is 4 and p is 1.

While any metallocene catalyst component can be used in the invention the monosubstituted metallocenes are preferred over the disubstituted. However the disubstituted and polysubstituted metallocenes still are better than counterpart catalyst systems produced in accordance with prior art methods. In a further embodiment the preferred metallocene catalyst component of the invention is represented by the formulas:

wherein Me is a Group 4, 5, 6 transition metal, each R', which can be the same or different is hydrogen, alkyl, alkenyl, aryl, alkylaryl or arylalkyl radical having from 1 to 20 carbon atom, R" is one or more of or a combination of a carbon, a germanium, a silicon, a phosphorous or a nitrogen atom containing radical bridging two ($C_5H_4R'$) rings, each Q which can be the same or different is an aryl, alkyl, alkenyl, alkylaryl, or arylalkyl radical having from 1 to 20 carbon atoms or halogen, Q' is an alkylidene radical having from 1–20 carbon atoms; s is 0 or 1, when s=1, then n=3, when s=0, n=4.

In another embodiment the metallocene catalyst component is represented by the formula:

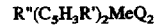

wherein Me is a Group 4, 5, 6 transition metal, each R' which can be the same or different is hydrogen, alkyl, alkenyl, aryl, alkylaryl or arylalkyl radical having from 1 to 20 carbon atoms, R" is one or more of a combination of a carbon, a germanium, a silicon, a phosphorous or a nitrogen atom containing radical bridging the $(C_5R'_m)$ ring back to Me, each Q which can be the same or different is an aryl, alkyl, alkenyl, alkylaryl, or arylalkyl radical having from 1 to 20 carbon atoms or halogen.

For the purposes of this patent specification, the terms "cocatalysts" and "activators" are used interchangeably and are defined to be any compound or component which can activate a bulky ligand transition metal compound or a metallocene, as defined above. It is within the scope of this invention to in addition to using alumoxane to also use ionizing ionic activators or compounds such as tri (n-butyl) ammonium tetra (pentaflurophenyl) boron, which ionize the neutral metallocene compound. Such ionizing compounds may contain an active proton, or some other cation associated with but not coordinated or only loosely coordinated to the remaining ion of the ionizing ionic compound. Such compounds and the like are described in EP-A-0520 732, EP-A-0 277 003 and EP-A-0 277 004, and U.S. Pat. Nos. 5,153,157, 5,198,401 and 5,241,025 are all herein fully incorporated by reference.

For purposes of this patent specification the term "carrier" or "support" are interchangeable and can be any support material, preferably a porous support material, capable of containing water, absorbed or adsorbed, such as for example, talc, inorganic oxides, inorganic chlorides and resinous support materials such as polyolefin or polymeric compounds or other organic support materials.

The preferred support materials are inorganic oxide materials, which include those from the Periodic Table of Elements of Groups 2, 3, 4, 5, 13 or 14 metal oxides. In a preferred embodiment, the catalyst support material include silica, alumina, silica-alumina, and mixtures thereof. Other inorganic oxides that may be employed either alone or in combination with the silica, alumina or silica-alumina are magnesia, titania, zirconia, and the like. Other suitable support materials can be employed such as, finely divided polyolefins, such as polyethylene or polymeric compounds and inorganic compounds such as magnesium dichloride and the like.

In accordance with this invention the support material preferably has a water content in the range of from about 3 weight percent to about 27 weight percent based on the total weight of the support material and water contained therein, preferably in the range of from about 7 weight percent to about 15 weight percent, and most preferably in the range of from about 9 weight percent to about 14 weight percent. The amount of water contained within the support material can be measured by techniques well known in the art. For the purposes of this patent specification and the appended claims the weight percent water is measured by determining the weight loss of the support material which has been heated and held at a temperature of about 1000° C. for about 16 hours. This procedure is known as "Loss on Ignition" (LOI) and is measured in weight percent.

Hereinafter, for the purposes of this patent specification and the appended claims the support material of the invention contains water.

The support material of the invention may be formed by adding or removing the desired quantity of water from, for example, commercially available silica (Davidson 948).

It is preferred that the carrier of the catalyst of this invention has a surface area in the range of from about 10 to about 700 m²/g, pore volume in the range of from about 0.1 to about 2.5 cc/g and average particle size in the range of from about 10 to about 500 μ. More preferably, the surface area is in the range of from about 50 to about 500 m²/g, pore volume of from about 0.5 to about 2.0 cc/g and average particle size of from about 20 to about 200 μm. Most preferably the surface area range is from about 100 to about 400 m²/g, pore volume from about 0.8 to about 2.0 cc/g and average particle size is from about 30 to about 100 μm.

Method of Producing the Activator of the Invention

In the method of making the catalyst system of the invention the support material is first contacted with a component capable of forming an activator for the metallocene catalyst component, as previously discussed.

In one embodiment, the preferred component is an organometallic compound of Group 1, 2, 3 and 4 organometallic alkyls, alkoxides, and halides. The preferred organometallic compounds are lithium alkyls, magnesium alkyls, magnesium alkyl halides, aluminum alkyls, silicon alkyl, silicon alkoxides and silicon alkyl halides. The more preferred organometallic compounds are aluminum alkyls and magnesium alkyls. The most preferred organometallic compounds are aluminum alkyls, for example, triethylaluminum (TEAL), trimethylaluminum (TMAL), tri-isobutylaluminum (TIBAL) and tri-n-hexylaluminum (TNHAL) and the like.

The most preferred organometallic compounds are those that when contacted with the water containing support material of the invention form an oxy-containing organometallic compound represented by the following general formula:

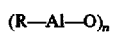

which is a cyclic compound and

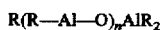

which is a linear or non-cyclic compound and mixtures thereof including multi-dimensional structures. In the general formula R is a $C_1$ to $C_{12}$ alkyl group such as for example methyl, ethyl, propyl, butyl, pentyl, hexyl, octyl, nonyl and n is an integer from about 1 to 20. The most preferred oxy containing organometallic compounds are alumoxanes, for example methyl alumoxane and/or ethylalumoxane.

In the preferred embodiment the support material is introduced to a solution of an organometallic compound such that the temperature of the solution containing the organometallic compound remains substantially constant throughout the introduction of the support material such that the temperature is always within the temperature ranges described below.

The temperature range for this step in the process of the invention is from about 30° C. to about –45° C., preferably from about 20° C. to about –30° C., even more preferably from about 10° C. to about –20° C., and most preferably from about 8° C. to about –20° C.

In another embodiment the temperature of the solution containing the organometallic compound is maintained in the range of from about 10° C. to about –20° C., preferably in the range of 5° C. to about –15° C. and most preferably in the range of –1° C. to about –10° C.

While it is preferred that the temperature remain substantially constant, the temperature depends on the quantity of the catalyst system of the invention being produced in a single batch. It is known in the art that formation of alumoxane by contacting for example TMAL with water is exothermic, thus, the larger the batch the more difficult it is to maintain a constant temperature.

For the purposes of this specification and appended claims "substantially constant" means that the temperature in the process of the invention does not vary by more than 10° C. from a specified temperature within the temperature ranges described above.

The amount of organometallic compound and water containing support material is such that the mole ratio of metal of the organometallic to the water content of the support material, for example TMAL/$H_2O$, is preferably in the range of from 0.7 to 1.5, preferably about 0.8 to 1.3, and even more preferably in the range of 0.9 to less than 1.3.

In another embodiment the mole ratio of the metal of the organometallic to water content of the support material is greater than 0.7, preferably in the range of greater than 0.8 to about 1 and most preferably greater than about 0.9 to less than about 1.0.

As the support material is added to the organometallic compound, for example when the organometallic compound is TMAL, alumoxane, an activator, is generated predominantly inside the pores of the support material.

It has been discovered that the alumoxane formed within the pores of the support material by using the methods described above forms an improved supported alumoxane not previously known. Using the method of the invention where the support material is added to an organometallic compound solution, a new supported alumoxane is formed. Separating the supernatant from the supported activator of the invention it was surprisingly discovered that the supernatant contained essentially no metal of the organometallic compound.

Using the prior art methods, when adding the water containing support material to an organometallic compound in a solution, the supernatant remaining after the alumoxane is formed has a large quantity of the organometallic compound and/or any alumoxane present. The quantity can be measured by atomic absorption techniques well known in the art, for example, for the purposes of this patent specification and appended claims, ICPES is used.

The supported activator, alumoxane, of the invention comprises a support material, silica and the like, and alumoxane where the alumoxane is anchored within the pores structure of the support material such that the extractability of the alumoxane, as measured by ICPES analysis of a compatible solvent in which the supported activator is placed, is essentially zero. Preferably less than 1000 ppm metal of the organometallic compound and/or activator, alumoxane, is extractable from a compatible solvent containing the supported activator of the invention, more preferably less than 500 ppm, even more preferably less than 100 ppm and still more preferably less than 50 ppm and most preferably less than 10 ppm.

In another embodiment, 98 mole percent to 100 mole percent of the total amount of organometallic compound used to make the supported activator of the invention is converted and bound to alumoxane, more preferably, about 100 mole percent such that the extractability of the organometallic compound and the alumoxane from the support material is essential zero.

In a preferred embodiment, the supported alumoxane of the invention has a high Mw, typically greater than about 500, preferably greater than about 800 to about 2000, more preferably from about 800 to about 1000. The pore diameter of the preferred support material has a majority distribution of pore diameters greater than 150 ° A.

Method of Producing the Catalyst System of the Invention

Once the support Material containing is contacted with the organoaluminum compound to form the activator of the invention, the metallocene catalyst component is then added. The supported activator can be dried before introducing the metallocene component, it can then be slurried in a suitable solvent as is known in the art and the metallocene catalyst component can be added thereafter.

In the preferred embodiment, the metallocene catalyst component is added to the support material/alumoxane solution, in which the supported activator was originally made, and is then heated to complete the reaction between the metallocene catalyst component and the alumoxane.

In one embodiment, the catalyst system at this point in the method of the invention is ready for introduction into a reactor in which polymerization of olefins can take place. In another embodiment, the catalyst system is dried to a free flowing powder, particularly for use in a gas or slurry phase polymerization process. Drying the catalyst makes it easily transportable and particularly useful in a gas phase polymerization process. In a further embodiment, the catalyst system is dried to a free flowing powder and re-slurried for use, particularly in a slurry polymerization process.

The supported catalyst system of the invention can be slurried in a aliphatic solvent, such as isobutene, or an aromatic solvent, such as toluene, or any other compatible solvent as is well known in the art.

Using the method of the invention where the support material is added to an organometallic compound solution, followed by the addition of a metallocene component, a new supported metallocene/alumoxane catalyst system is formed. Separating the supernatant from the supported catalyst system of the invention it was surprisingly discovered that the supernatant contained essentially no metal of the organometallic compound and/or alumoxane or the metal of the metallocene component.

For the purposes of this patent specification "essentially insoluble" means that less than 1000 ppm metal of the organometallic compound and/or less than 50 ppm metal of the metallocene component of the invention in a compatible solvent is extractable.

The quantity of metal as previously discussed is measured by ICPES. The supported catalyst system of the invention comprises a supported material, silica and the like, alumoxane and a metallocene component, such that the extractability of the metal of the organometallic compound and/or alumoxane and the transition metal of the metallocene component as measured by ICPES is essentially zero.

Preferably less than 1000 ppm metal of the organometallic compound and/or activator, alumoxane is extractable from a compatible solvent containing the supported catalyst system of the invention, more preferably less than 500 ppm, even more preferably less than 100 ppm and still more preferably less than 50 ppm and most preferably less than 10 ppm. Also, preferably less than 50 ppm transition metal of the metallocene component of the invention in a compatible solvent, such as toluene, is extractable from the supported catalyst system of the invention, more preferably less than 30 ppm, even more preferably less than 20 ppm and most preferably less than 10 ppm.

Polymerization Process of the Invention

The catalyst system of this invention is suited for the polymerization of monomers and optionally comonomers in any polymerization or prepolymerization process, gas, slurry or solution phase; even a high pressure autoclave process can be utilized. In the preferred embodiment a gas phase or slurry phase process is utilized, most preferably a slurry phase process is used.

In the preferred embodiment, this invention is directed toward the slurry or gas phase polymerization or copolymerization reactions involving the polymerization or optionally prepolymerization of one or more of the alpha-olefin monomers having from 2 to 20 carbon atoms, preferably 2–12 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1, and cyclic olefins such as styrene. Other monomers can include polar vinyl, diolefins such as dienes, norbornene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms. In another embodiment ethylene is polymerized with at least two comonomers to form a terpolymer and the like.

In one embodiment of the process of the invention, the olefin(s) are prepolymerized in the presence of the catalyst system of the invention prior to the main polymerization. The prepolymerization can be carded out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833 and 4,921,825 and EP-B-0279 863, published Oct. 14, 1992 all of which are incorporated fully herein by reference.

Typically in a gas phase polymerization process a continuous cycle is employed where in one part of the cycle, of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399 and 4,588,790, incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

The catalyst is introduced into the reactor via a catalyst feeder mechanism either continuously or intermittently as is known in the art. Usually the catalyst is contained in a vessel with a mechanism for controlling the quantity of catalyst to be injected into the reactor. Typically the catalyst is introduced into the reactor with a gas such as nitrogen or can be introduced as a slurry in a inert volatile solvent. Many times these systems have multiple catalyst feeders and injection points for introducing catalyst into a reactor.

A slurry polymerization process generally uses pressures in the range of about 1 to about 500 atmospheres and even greater and temperatures in the range of –60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, ethylbenzene or xylene. The medium employed should be liquid under the conditions of polymerization and relatively inert. Preferably, hexane or isobutene is employed.

Polymer Compositions and Applications of the Invention

MWD, or polydispersity, is a well known characteristic of polymers. MWD is generally described as the ratio of the weight average molecular weight (Mw) to the number average molecular weight (Mn). The ratio Mw/Mn can be measured directly by gel permeation chromatography techniques, or indirectly, by measuring the ratio of $I_{21}$ to $I_2$ as described in ASTM D-1238-F and ASTM D-1238-E respectively. $I_2$ is well known in the art as equivalent to Melt Index (MI). $I_{21}$ is also known as high load melt index (HLMI). MI is inversely proportional to the molecular weight of the polymer (Mw). The MI of the polymers of the invention are generally in the range of about 0.1 dg/min to about 1000 dg/min, preferably about 0.2 dg/min to about 300 dg/min, more preferably about 0.3 to about 200 dg/min and most preferably about 0.5 dg/min to about 100 dg/min.

The ratio of $I_{21}/I_2$ is known as the melt index ratio (MIR) and for the purposes of this patent specification the ratio is also defined to be melt flow ratio (MFR). MIR is generally proportional to the MWD.

The MIR of the polymers of this invention are generally in the range of greater than 14 to about 200, preferably about 18 to 60 and most preferably about 22 to about 45.

The polymer compositions of the invention have a density in the range of from about 0.86 g/cm$^3$ to about 0.97 g/cm$^3$, preferably about 0.88 g/cm$^3$ to about 0.96 g/cm$^3$, more preferably between about 0.90 g/cm$^3$ to about 0.955 g/cm$^3$ and most preferably between about 0.91 g/cm$^3$ to about 0.95 g/cm$^3$.

The MWD of the polymers of the invention are in the range of greater than about 1.8 to about greater than 10, preferably in the range of greater than about 2 to about 5.

Another important characteristic of the polymer of the invention is its composition distribution (CD). A measure of composition distribution is the "Composition Distribution Breadth Index" ("CDBI"). CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions are assumed to have a Mn ≧ 15,000, where Mn is the number average molecular weight fraction. Low weight fractions generally represent a trivial portion of the polymer of the present invention. The remainder of this description and the appended claims maintain this convention of assuming all weight fractions have a Mn >15,000 in the CDBI measurement.

From the weight fraction versus composition distribution curve the CDBI is determined by establishing what weight percent of the sample has a comonomer content within 25% each side of the median comonomer content. Further details of determining the CDBI of a copolymer are known to those skilled in the art. See, for example, PCT Patent Application WO 93/03093, published Feb. 18, 1993.

The polymers of the present invention have CDBI's generally in the range of greater than 50% to 99%, preferably in the range of 55% to 85%, and more preferably 60% to 80%, even more preferably greater than 60%, still even more preferably greater than 65%. Obviously, higher or lower CDBI's may be obtained using other catalyst systems with changes in the operating conditions of the process employed.

In some instances where it is necessary to improve processability and manipulate final end product characteristics the polymers produced by this present invention can be blended or coextruded into single or multilayer films or the like with various other polymers well known in the art, for instance, LLDPE, LDPE, HDPE, polypropylene, PB, EVA and the like. The polymers produced by the process of the invention are useful in such forming operations include film, sheet, and fiber extrusion and co-extrusion as well as blow molding, injection molding and rotary molding. Films include blown or cast films in mono-layer or multilayer constructions formed by coextrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages and limitations thereof, the following examples are offered.

Density is measured in accordance with ASTM-D-1238. The ratio of Mw/Mn can be measured directly by gel permeation chromatography techniques. For the purposes of this patent specification the MWD of a polymer is determined with a Waters Gel Permeation Chromatograph equipped with Ultrastyrogel columns and a refractive index detector. In this development, the operating temperatures of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

EXAMPLE 1

Into a 1 liter flask equipped with mechanical stirrer, 180 ml of TMAL in heptane solution (15 wt %) and 90 ml of heptane were charged. The solution was cooled and maintained at a temperature of 45° F. (7.2° C.). A 40 g sample of silica gel (Davison D-948 with average particle size of 70 micron) which contained 12.5 wt % of water was slowly added into the flask over 70 minutes. The mole ratio TMAL/$H_2O$ was 0.91. 0.9 g of(n-BuCp)$_2$ZrCl$_2$ slurred in 20 ml of heptane was then added into the vessel. The mixture was allowed to react at 165° F. (74° C.) for 1 hour. At the end of the reaction, the solid was dried by nitrogen purging. A free flowing solid was obtained at the end of the preparation.

Into a clean 2 liter autoclave, 800 ml of hexane was charged. 2.0 ml of TIBAL in heptane solution (1.78 mmole Al) was charged into the autoclave. The reactor was heated to 80° C. 100 mg of the catalyst prepared above was then charged into the autoclave through a catalyst injection tube. The catalyst was injected into the autoclave by pressurized ethylene. The autoclave was pressurized with ethylene to a total pressure of 150 psig (1034 kPag). Ethylene was continuously fed into the autoclave by setting the ethylene feed regulator at 150 psig (1034 kPag). The polymerization was allowed to proceed at 80° C. for 30 minutes. After the polymerization, the polymer slurry was transferred into a evaporation dish. The surface of autoclave wall and agitator was very clean. The product was recovered by letting the solvent evaporate. A total of 79 g of polymer having a density of 0.95 g/cc and MI of 0.6 dg/10 min was obtained with no indication of fouling.

EXAMPLE 2

Example 1 was repeated except that after the TMAL/silica reaction, the mixture was warmed up and held at 75° F. (24° C.) for one hour before adding the metallocene. The TMAL/$H_2O$ mole ratio was 0.91. A total of 60 g of polymer having a density of 0.95 g/cc and MI of 0.6 dg/10 min was obtained with no indication of fouling.

EXAMPLE 3

Example 1 was repeated except that 1) a Crosfield EP-10X silica gel (with average particle size of 90 micron) which contained 15.8% water; 2) 230 ml TMAL with 115 ml heptane; 3) TMAL/silica reaction temperature of 25° F. (−3.9° C.) were used in the catalyst preparation. The mole ratio of TMAL/$H_2O$ was 0.92. A total of 68 g of polymer having a density of 0.95 g/cc and MI of 0.6 dg/10 min was obtained with no indication of fouling.

EXAMPLE 4

Example 3 was repeated except that a TMAL/silica reaction temperature of 50° F. (10° C.) was used in the catalyst preparation. The mole ratio of TMAL/$H_2O$ was 0.92. A total of 53g of polymer having a density of 0.95 g/cc and MI of 0.6 dg/10 min was obtained with no indication of fouling.

EXAMPLE 5

Example 1 was repeated except that the metallocene in heptane solution was reacted with 1 ml of TMAL (15% in heptane) before it was charged into the flask. The mole ratio of TMAL/$H_2O$ was 0.91. A total of 52 g polymer having a density of 0.95 g/cc and MI of 0.6 dg/10 min was obtained and a minor degree of reactor fouling was observed.

EXAMPLE 6

Example 1 was repeated except that a D-948 silica gel with an average particle size of 50 micron was used in the catalyst preparation. The mole ratio of TMAL/$H_2O$ was 0.91. A total of 88 g of polymer having a density of 0.95 g/cc and MI of 0.6 dg/10 min was obtained with no indication of fouling.

EXAMPLE 7

Example 6 was repeated except that a TMAL/silica reaction temperature of 25° F. (−3.9° C.) was used in the catalyst preparation. The mole ratio of TMAL/H$_2$O was 0.91. A total of 103 g of polymer having a density of 0.95 g/cc and MI of 0.6 dg/10 min was obtained with no indication of fouling.

EXAMPLE 8

Into a 1 liter flask equipped with a mechanical stirrer, 180 ml of TMAL in heptane solution (15 wt %) and 90 ml of heptane were charged. The solution was cooled and maintained at a temperature 45° F. (7.2° C.). 40 g of silica gel (Davison D-948 with average particle size of 50 micron), which contained 12.5 wt % of water was slowly added into the flask. The mole ratio of TMAL/H$_2$O was 0.91. 0.9 g of (1,3-BuMeCp)$_2$ZrCl$_2$ dissolved in 20 ml of heptane was added into the vessel. The mixture was allowed to react at 165° F. (74° C.) for 1 hour. At the end of the reaction, the solid was dried by nitrogen purging. A free flowing solid was obtained at the end of the preparation.

Into a 150 ml vial, add 0.1 g of ethoxylated stearyl amine antistatic agent (trade name Karoamine AS-990 from Witco) and 100 ml of hexane. The AS-990 was completely dissolved into the hexane solution to form the stock solution.

Into a clean 2 liter autoclave, 800 ml of hexane was charged. 2.0 ml of TIBAL in heptane solution (1.78 mmole Al) was followed of 4.0 ml of AS-990 stock solution prepared above was charged into the autoclave. The reactor was heated to 85° C. A 125 mg of the catalyst prepared above was then charged into the autoclave through a catalyst injection tube. The catalyst was injected into the autoclave by pressurized ethylene. The autoclave was pressurized with ethylene to a total pressure of 150 psig (1034 kPag). Ethylene was continuously fed into the autoclave by setting the ethylene feed regulator at 150 psig (1034 kPag). The polymerization was allowed to proceed at 85° C. for 30 minutes. After the polymerization, the polymer slurry was transferred into a evaporation dish. The surface of autoclave wall and agitator were relatively clean. The product was recovered by letting the solvent evaporate. A total of 41 g of polymer having a density of 0.95 g/cc and MI of 0.6 dg/10 min was obtained with no indication of fouling.

EXAMPLE 9

Example 8 was repeated except that no AS-990 solution was added into the autoclave. An inspection of the reactor after the polymerization revealed the surface of autoclave wall and agitator were coated with some polymer. A total of 40 g polymer having a density of 0.95 g/cc and MI of 0.6 dg/10 min was obtained.

COMPARATIVE EXAMPLE 10

Into a 1 liter flask equipped with mechanical stirrer, 220 ml of TMAL in heptane solution (15 wt %) was charged. The solution was cooled to a temperature of 55° F. (12° C.). 40 g of silica gel (Davison D-948 with average particle size of 50 micron) which contained 12.5 wt % of water was slowly added into the flask and the temperature increased to about 80° F. (27° C.). The mole ratio of TMAL/H$_2$O was 1.13. 0.9 g of (1,3-BuMeCp)$_2$ZrCl$_2$ dissolved in 20 ml of heptane was added into the vessel. The mixture was allowed to react at 150° F. (66° C.) for 1 hour. At the end of the reaction, the solid was dried by nitrogen purging. A free flowing solid was obtained at the end of the preparation.

The same polymerization procedures used in Example 8 was repeated except that the catalyst made above was used. An inspection of the reactor after the polymerization revealed the surface of autoclave wall and agitator was coated with thick layer of polymer and most of the polymer product was fused together. A total of 18 g polymer having a density of 0.95 g/cc and MI of 0.6 dg/10 min was obtained.

EXAMPLE 11

In the above two catalyst preparations Example 1 of the invention and Comparative Example 10 of the prior art, after the metallocene was reacted with their respective supported activators in solution, the slurry mixtures of each sample were allowed to settle and the supernatant were collected for elemental analysis. The result of this analysis is listed in the following Table.

TABLE 1

| Example | TMA/H$_2$O | Al | Zr |
|---|---|---|---|
| Example 1 of the Invention | 0.91 | 8 ppm | 8 ppm |
| Comparative Example 10 | 1.13 | 17153 ppm | 99 ppm |

While the present invention has been described and illustrated by reference to particular embodiments, it will be appreciated by those of ordinary skill in the art that the inventions lends itself to variations not necessarily illustrated herein. For example, it is within the scope of this invention to mix at least two of the catalysts of the invention or to use the catalyst of the invention with any other catalyst or catalyst system known in the art, for example a traditional Ziegler-Natta catalyst or catalyst system. Also the catalyst system of the invention can be used in a single reactor or in a series reactor. The supported activator of the invention can be used with any metallocene or traditional Ziegler-Natta catalyst. For this reason, then, reference should be made solely to the appended claims for purposes of determining the true scope of the present invention.

We claim:

1. A method for producing a supported catalyst system, said method comprising the steps of: reacting a water containing support material with a solution of an alkyl aluminum compound which is at a temperature in the range of from about 10° C. to about −20° C. and maintaining a constant temperature that is in the range of from 30° C. to about −20° C. during the reaction wherein the mole ratio of the metal of the alkyl aluminum compound to the water content of the support material is greater than 0.7; and adding at least one metallocene catalyst component.

2. The method of claim 1 wherein the support material is selected from the group consisting of silica, alumina and magnesia.

3. The method of claim 1 wherein the alkyl aluminum compound is selected from the group consisting of TMAL, TIBAL, TEAL and TNHAL.

4. The method of claim 1 wherein the reaction is maintaining in the constant temperature in the range of from about 0° C. to about 10° C.

5. The method of claim 1 wherein the water content of the support material is in the range of from about 3 weight percent to about 27 weight percent based on the total weight of the support material.

6. The method of claim 1 wherein the water content of the support material is in the range of from about 7 weight percent to about 15 weight percent based on the total weight of the support material.

7. The method of claim 1 wherein the water content of the support material is in the range of from about 9 weight percent to about 14 weight percent based on the total weight of the support material.

8. The method of claim 1 wherein the mole ratio of the metal of the alkyl aluminum compound to the water content of the support material is in the range from about 0.7 to about 1.5.

9. The method of claim 1 wherein the mole ratio of the metal of alkyl aluminum compound to the water content of the support material is in the range from about 0.8 to about 1.

10. The method of claim 1 wherein the metallocene catalyst component is represented by the formula:

$(C_5R'_m)_pR''_s(C_5R'_m)MeQ_{3-p-x}$ or $R''_s(C_5R'_m)_2MeQ'$ wherein Me is a Group 4, 5, 6 transition metal, $C_5R'_m$ is an unsubstituted or a substituted cyclopentadienyl, each R', which can be the same or different is hydrogen, alkyl, alkenyl, aryl, alkylaryl or arylalkyl radical having from 1 to 20 carbon atoms or two carbon atoms joined together to form a part of a $C_4$ to $C_{20}$ ring, R" is one or a combination of a carbon, a germanium, a silicon, a phosphorous or a nitrogen atom containing radical bridging two $(C_5R'_m)$ rings, or bridging one $(C_5R'm)$ ring back to Me, when p=0 and x=1 otherwise "x" is always equal to 0, each Q which can be the same or different is an aryl, alkyl, alkenyl, alkylaryl, or arylalkyl radical having from 1 to 20 carbon atoms or halogen, Q' is an alkylidene radical having from 1–20 carbon atoms, s is 0 or 1 and when s is 0, m is 5 and p is 0, 1 or 2 and when s is 1, m is 4 and p is 1.

11. The method of claim 1 wherein the metallocene catalyst component is represented by the formula:

$(C_5H_nR')R''_s(C_5H_nR')MeQ_2$ or $R''(C_5H_nR')_2MeQ'$ wherein Me is a Group 4, 5, 6 transition metal, each R', which can be the same or different is hydrogen, alkyl, alkenyl, aryl, alkylaryl or arylalkyl radical having from 1 to 20 carbon atom, R" is one or a combination of a carbon, a germanium, a silicon, a phosphorous or a nitrogen atom containing radical bridging two $(C_5H_4R')$ rings, each Q which can be the same or different is an aryl, alkyl, alkenyl, alkylaryl, or arylalkyl radical having from 1 to 20 carbon atoms or halogen, Q' is an alkylidene radical having from 1–20 carbon atoms; when s=1, then n=3, and when s=0, then n=4.

12. The method of claim 1 wherein the catalyst system is dried to a free flowing powder.

13. The method of claim 12 wherein the catalyst system is further slurried in a solvent.

* * * * *